United States Patent [19]

Gotou

[11] Patent Number: 4,766,735

[45] Date of Patent: Aug. 30, 1988

[54] INVERTER-AIDED MULTISYSTEM AIR CONDITIONER WITH CONTROL FUNCTIONS OF REFRIGERANT DISTRIBUTION AND SUPERHEATING STATES

[75] Inventor: Yukifumi Gotou, Fuji, Japan

[73] Assignee: Kabushiki Kaisha Toshiba, Kawasaki, Japan

[21] Appl. No.: 77,811

[22] Filed: Jul. 27, 1987

[30] Foreign Application Priority Data

Jul. 29, 1986 [JP] Japan ................................ 61-178305

[51] Int. Cl.$^4$ .............................................. F24F 3/00
[52] U.S. Cl. ...................................... 62/175; 62/199; 62/225; 62/204; 62/212; 165/22
[58] Field of Search ................. 62/175, 199, 200, 203, 62/204, 205, 206, 208, 209, 210, 211, 212, 222, 223, 224, 225, 226, 227, 228.4; 165/22; 236/1 B

[56] References Cited

U.S. PATENT DOCUMENTS

| | | | |
|---|---|---|---|
| 4,448,038 | 5/1984 | Barbier | 62/212 |
| 4,487,031 | 12/1984 | Rogers et al. | 62/228.3 |
| 4,499,739 | 2/1985 | Matsuoka et al. | 62/225 X |
| 4,510,767 | 4/1985 | Komatsu et al. | 62/200 |
| 4,644,756 | 2/1987 | Sugimoto et al. | 62/225 X |

FOREIGN PATENT DOCUMENTS

602536 3/1979 Japan .
2038036 7/1980 United Kingdom .
2046481 11/1980 United Kingdom .
2152245 7/1985 United Kingdom .

Primary Examiner—Harry B. Tanner
Attorney, Agent, or Firm—Cushman, Darby & Cushman

[57] ABSTRACT

A single outdoor unit has at least an inverter circuit, a compressor motor, a variable capacity compressor, and an outdoor heat exchanger. A plurality of indoor units each have at least an indoor heat exchanger and an air-conditioning load detector. A distribution unit couples the single outdoor unit to the plurality of indoor units in parallel by liquid-side refrigerant piping and gas-side refrigerant piping, to form a refrigerating cycle of a heat pump type. The liquid-side refrigerant piping includes a motor-operated flow regulating valve and pressure reducer, which are connected in series fashion. A pseudo-refrigerant superheating state detector detects a pseudo-refrigerant overheating state on the basis of the temperature of the refrigerant in the aggregated portion of gas-side refrigerant piping of the distribution unit. A first controller respectively controls the open factors of the motor-operated flow regulating valves. A second controller computes a total amount of the contents of the predetermined frequency data corresponding to a total air conditioning load of the indoor heat exchangers and controls the output frequency of the inverter circuit according to the total amount. A third controller incrementally controls the open factor of the motor-operated flow regulating valves to a value larger than the current value, on the basis of the detection result of the pseudo-refrigerant superheat state detector.

6 Claims, 5 Drawing Sheets

INVERTER-AIDED MULTISYSTEM AIR CONDITIONER WITH CONTROL FUNCTIONS OF REFRIGERANT DISTRIBUTION AND SUPERHEATING STATES

BACKGROUND OF THE INVENTION

This invention generally relates to an air conditioner which comprises a single outdoor unit and a plurality of indoor units and, more particularly, to an inverter-aided multisystem air conditioner with control functions of refrigerant distribution and superheating states.

A recent trend in the air conditioning systems mainly used in small and medium size buildings is to use a so-called decentralized air conditioning system in which many air-cooling type air conditioners of a relatively small cooling capacity are installed in the required locations of a building in a decentralized manner. As the result of progressive improvements of this type of air conditioner system, some large buildings have also recently employed such air conditioner systems. However, the use of such air conditioning systems in large buildings involves some problems. For example, since many air conditioners must be installed, much space is required. It is difficult to find enough space for installing the outdoor units of the air conditioners. Additionally, the refrigerant piping with many pipe connections is complicated and difficult to install. To cope with this problem, multisystem air conditioners have recently been proposed for building use. The proposed conditioners have simple and easy piping installation and many improved functions. Hence, many buildings have begun to employ this type of air conditioner. The proposed air conditioners are featured by:

(1) Space-saving installation requirements for the outdoor units,
(2) Few restrictions in refrigerant piping (length and head),
(3) Good controllability for the indoor units,
(4) Individually controllable air conditioners for each segmented room and each zone.

These features greatly contribute to the popularity of the decentralized air conditioners. To attain an ideal air conditioner system, however, there are still many problems to be solved:

(1) A limited cooling capacity (cooling ability) of the indoor unit,
(2) An inability to coordinate the individual operation of the air conditioners in an economically optimum mode according to the overall air conditioning load conditions.
(3) It is difficult to optimumly operate the air conditioners having different air conditioner load conditions in the air conditioning system of the building. To cope with this, the cooling capacity of the air conditioner system is set to a value slightly larger than that required for the actual use.

To solve the above problems, the following copending patent application has been filed, which has been assigned to the same assignee as that of the present patent application, and whose inventors contain one of the inventors in the present patent application:
U.S. Pat. Ser. No. 923,643
Filing date 10/27/86,
Title: "Multi-Type Air Conditioner with Optimum Control for Each Load U.S. Pat. No. 4,720,982".

This prior patent application will be described in brief.

A microcomputer of the multi-controller is used for controlling both the refrigerant and the electrical systems. Another microcomputer is used for each of the indoor and outdoor units, as in the ordinary inverter air-conditioners.

In the system operation, the microcomputer of the indoor unit first detects the present difference between room temperature and a desired room temperature as preset by the operating unit (of remote control type), and calculates a necessary cooling capacity, and determines a corresponding operating condition, and sends operation commands for start/stop, cooling/heating mode, and operating frequency, which are prepared on the basis of the determined operating condition.

The microcomputer in the multi-controller compensates for the varied cooling capacities of indoor units on the basis of the operating frequency commands from the respective indoor units, and computes the necessary cooling capacity for the overall system, and determines the optimum compressor capacity (inverter output frequency), and sends it to the outdoor units.

In response to the command of the optimum compressor capacity, the outdoor unit operates the compressor at the compensated operating frequency. In the refrigerating cycle of the multi-controller, an open factor of the motor-operated regulating valve of each indoor unit is controlled in proportion to the compensated operating frequency, to regulate an amount of circulating refrigerant.

Thus, the prior art can effectively control the distribution of refrigerant according to the air conditioning load.

There is a demand for further improving the prior art to realize a reliable control for the decentralized air conditioning system by effectively controlling the superheating states of refrigerant.

SUMMARY OF THE INVENTION

It is, therefore, an object of the present invention to provide a new and improved inverter-aided multisystem air conditioner with control functions of refrigerant distribution and superheating states, particularly of the type having a heat pump refrigerating cycle, in which the air conditioner is capable of effectively controlling the distribution of refrigerant according to the cooling capacity required for each air conditioner load, and also can control superheating states of refrigerant in the refrigerating cycle at all times, thereby providing stable and effective operation of the air conditioner.

According to the present invention, there is provided an inverter-aided multisystem air conditioner comprising a single outdoor unit having at least an inverter circuit for supplying a drive power at a predetermined frequency; a compressor motor to be variably driven by the drive power from the inverter circuit; a variable capacity compressor coupled to the compressor motor; an outdoor heat exchanger coupled to the compressor; a plurality of indoor units, each having at least an indoor heat exchanger and means for detecting the air-conditioning load of the indoor heat exchanger, the air-conditioning load detecting means having means for setting a desired temperature and means for detecting the indoor temperature, and means for outputting data at a predetermined frequency corresponding to a difference between the set temperature by the temperature setting means and the detected temperature by the indoor temperature detecting means; distribution means for connecting the single outdoor unit to the plurality of indoor units in parallel by liquid-side refrigerant piping and gas-side refrigerant piping, to form a refrigerating cycle of a heat pump type, the liquid-side refrigerant piping including motor-operated flow regulating means and pressure reducing means, both being connected in a series fashion; pseudo refrigerant superheating state detecting means for detecting a pseudo refrigerant superheating state on the basis of the temperature of the refrigerant in the aggregated portion of the gas-side refrigerant pipings of the distribution means; first control means for outputting first predetermined control signals respectively for controlling the open factors of the motor-operated flow regulating means in accordance with the predetermined frequency data from the predetermined frequency data generating means of the air-conditioning load detect means; second control means for computing, by using the predetermined frequency data from the predetermined frequency data generating means of the air conditioning load detect means, a total amount of the contents of the predetermined frequency data corresponding to a total air conditioning load of the indoor heat exchangers, and for outputting second predetermined control signals for controlling the output frequency of the inverter circuit in accordance with the total amount; and third control means for outputting third predetermined control signals each for incrementally controlling the open factor of the motor-operated flow regulating means to a value larger than the current value, on the basis of the detection result of the pseudo refrigerent superheating state detecting means.

BRIEF DESCRIPTION OF THE DRAWINGS

These and other objects and features of the present invention can be understood through the following description of the embodiment with reference to the accompanying drawings, in which.

DETAILED DESCRIPTION OF THE PREFERRED EMBODIMENT

Before proceeding with the detailed description of an embodiment of this invention, the necessity for the control of refrigerant superheating state in a multisystem air conditioner, which is the subject matter of this invention, will first be described.

Figure 1:
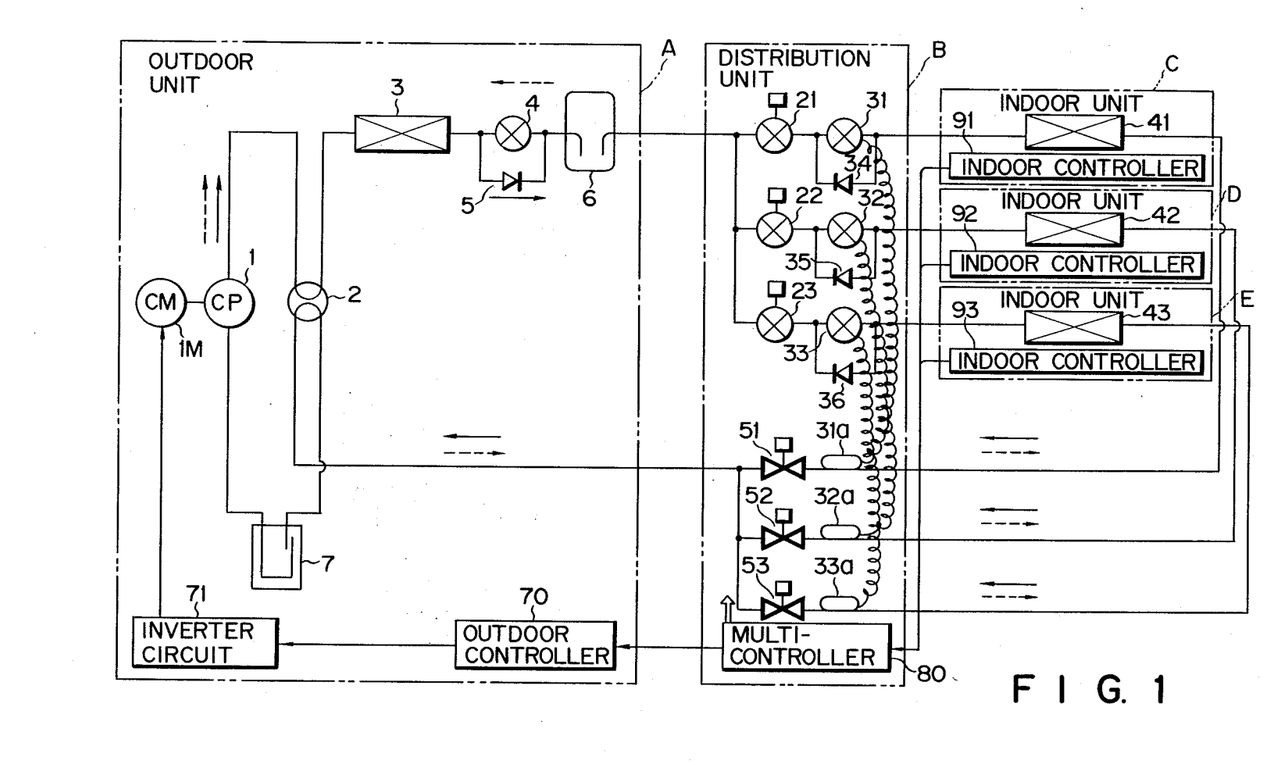
FIG. 1 shows a block diagram illustrating a refrigerating cycle in the scheme of this invention.

Reference is made to FIG. 1, which is a schematic illustration of an air-conditioner with a heat pump refrigerating cycle which can control, like the copending application, the distribution of refrigerant according to the required cooling capacity by the air conditioner load.

In FIG. 1, reference symbol A represents an outdoor unit. B represents a distribution unit. C, D and E represent indoor units. Variable capacity type compressor 1, four way valve 2, outdoor heat exchanger 3, a parallel circuit of expansion valve 4 for heating, non-return valve 5 for forming a cooling cycle, liquid tank 6, motor-operated flow regulating valves 21, 22 and 23, expansion valves 31, 32 and 33 as pressure reducing means for cooling, indoor heat exchangers 41, 42 and 43, gas-side valves (solenoid valves) 51, 52 and 53, and accumulator 7 are communicatively coupled to form a heat pump type refrigerating cycle. Cooling expansion valves 31, 32 and 33 respectively include temperature sensing tubes 31a, 32a and 33a. These temperature sensing tubes are respectively mounted on the gas-side refrigerant piping of indoor heat exchangers 41, 42 and 43. Heating cycle-forming non-return valves 34, 35 and 36 are respectively connected in parallel with the cooling expansion valves 31, 32 and 33.

As shown, indoor heat exchangers 41, 42 and 43 are connected in parallel with one another. In a cooling operation, the refrigerant flows in the direction of the solid-line arrow, thus forming a cooling cycle. For a heating operation, the refrigerant flows in the direction of the broken line arrow, by the switching operation of four way valve 2, to form a heating cycle. Outdoor unit A includes inverter circuit 71 for variably driving motor 1M of compressor 1, and outdoor controller 70 for controlling inverter 71. Distribution unit B includes multi-controller 80 for controlling the open factors of motor-operated flow regulating values 21, 22 and 23, and solenoid on/off valves 51, 52 and 53, and also for giving commands to outdoor controller 70. Indoor units C, D and E respectively include indoor controllers 91, 92 and 93, each for giving an operating command to multi-controller 80 in accordance with the required cooling capacity. These controllers 70, 80, and 91 to 93, execute the distribution control of refrigerant according to each air conditioner load which is performed in the "Multi-System Air Conditioner".

In such an air-conditioner, the capacity of compressor 1 is controlled so as to satisfy the required capacities of indoor units C, D and E. The open factors of flow regulating valves 21, 22 and 23 are controlled in accordance with the required capacity of each of indoor units C, D and E, in order to control the refrigerant flow to each indoor heat exchanger. In this case, the superheating states of indoor heat exchangers 41, 42 and 43 are kept constant irrespective of a change in the refrigerant flow rate, by means of expansion valves 31, 32 and 33. This realizes a stable and effective operation.

Therefore, during the cooling operation, for example, if the user selects a low temperature (the required capacity is large), the capacity of compressor 1 increases. Conversely, if he selects a high temperature (the required capacity is small), the capacity of compressor 1 decreases, and the refrigerant flow to indoor heat exchanger 41 reduces. During this small-capacity operation, the appropriate control of the refrigerant superheating state by expansion valves 31 is difficult, because the refrigerant flow is restricted. Under this condition, the operation tends to be instable over the entire refrigerating cycle.

In other words, in the refrigerant flow control by the flow regulating valves, temperature of the refrigerant flowing into the compressor rises under the overload condition in the cooling mode, up to values outside the tolerable operating temperature range of the compressor.

For the above reasons, the refrigerant superheating states must be controlled so as to be within a predetermined range.

An embodiment of this invention will be described with reference to the accompanying drawings. In the figure, like portions are denoted by like reference numerals, and therefore, the detailed description thereof will be omitted.

Figure 2:
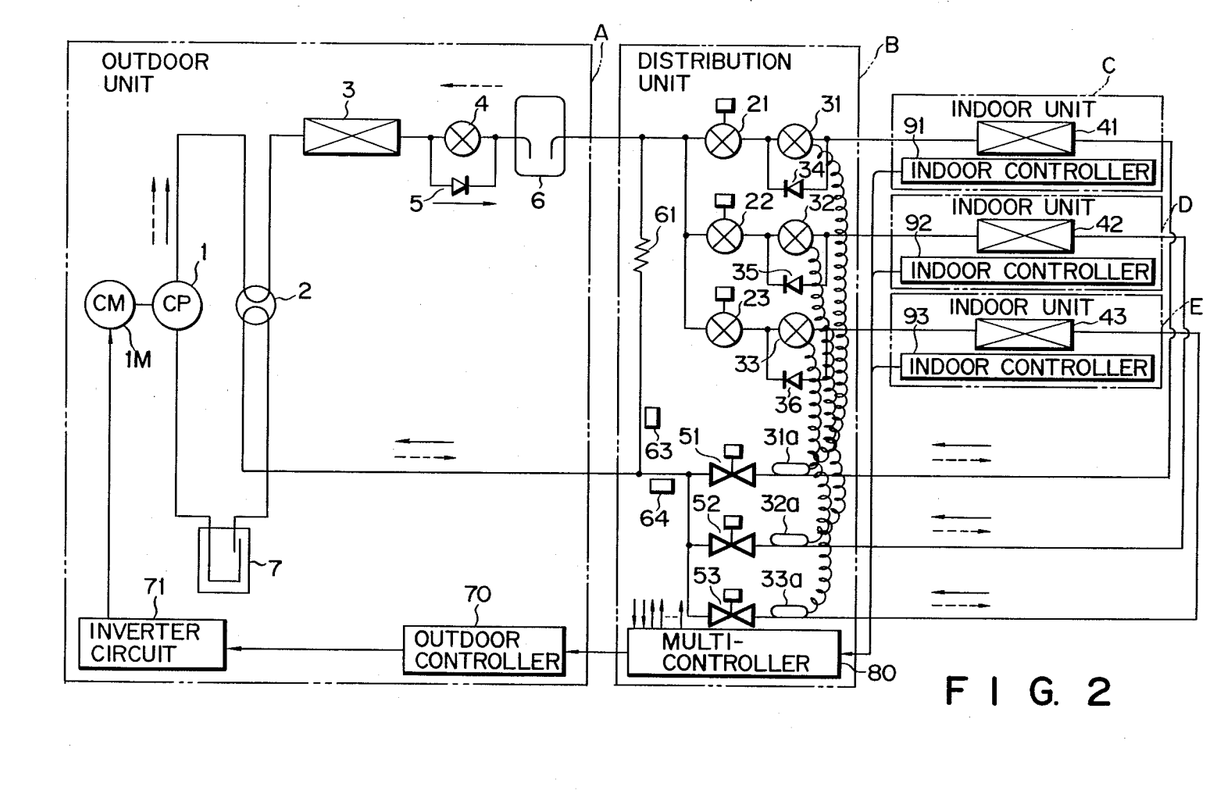
FIG. 2 shows a block diagram illustrating a refrigerating cycle in an embodiment of this invention.

As shown in FIG. 2, bypass 62 is provided between the aggregated portion of liquid-side refrigerant piping for indoor heat exchangers 41, 42 and 43, and the aggregated portion of gas-side refrigerant piping. Temperature sensor 63 is mounted on the outlet side of bypass 62. Temperature sensor 64 is mounted on the aggregated portion of the gas-side refrigerant piping.

Figure 3:
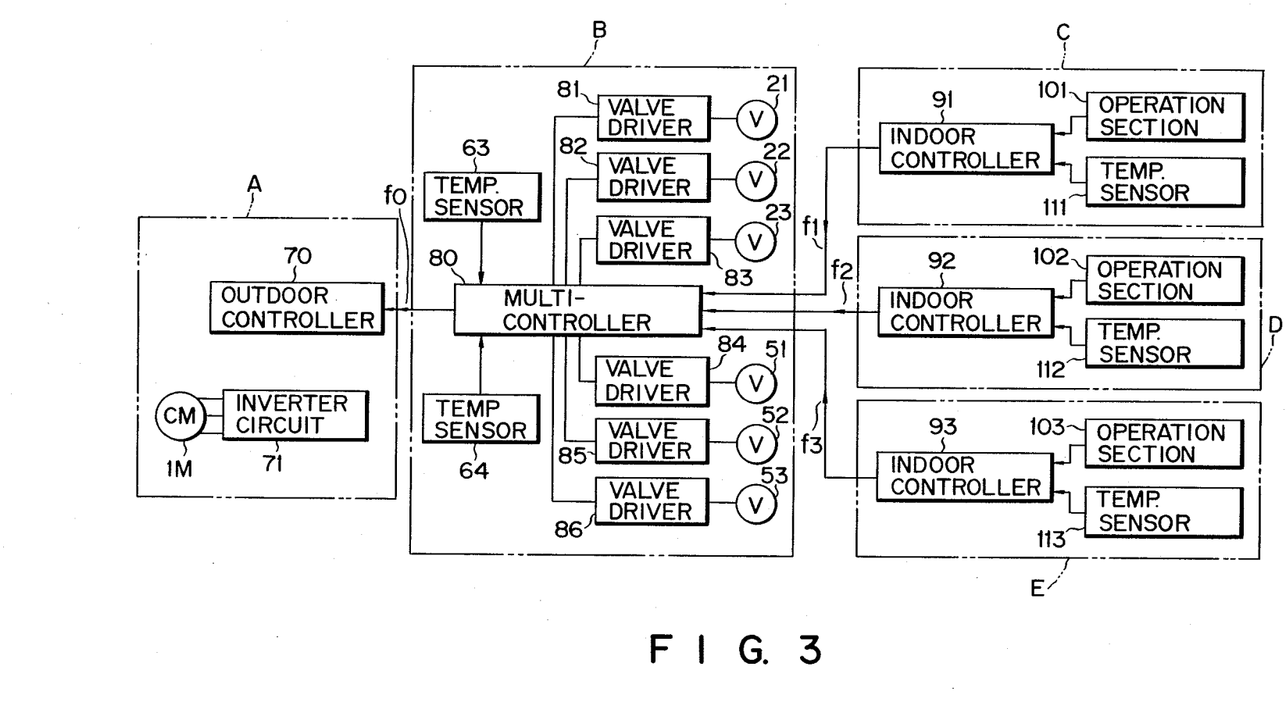
FIG. 3 shows a block diagram illustrating a control circuit in the embodiment.

FIG. 3 shows the control circuit for the air conditioner under discussion.

Outdoor unit A includes outdoor controller 70 made up of a microcomputer and its peripheral circuitry, for example. Outdoor controller 70 is connected to inverter circuit 71. Inverter circuit 71 converts the commercial AC power voltage into DC power voltage. It then converts the DC power into AC power voltage at a predetermined frequency through a switching operation based on the command from outdoor controller 70, and outputs AC power as a drive power for compressor motor 1M.

Distribution unit B includes multi-controller 80 made up of a microcomputer and its peripheral circuitry, for example. Multi-controller 80 is connected to temperature sensors 63 and 64 and valve drivers 81 to 86. These valve drivers 81 to 83 and 84 to 86 respectively drive and control flow regulating valves 21 to 23 and valves 51 to 53.

Indoor units C, D and E respectively include indoor controllers 91, 92 and 93, each made up of a microcomputer and its peripheral circuitry. These indoor controllers are connected respectively to operation sections 101, 102 and 103, and also respectively to temperature sensors 111, 112, 113.

Control commands by serial signals are transferred from each indoor controller to multi-controller 80.

The operation of the multisystem air conditioner thus configured will be described.

The control function of the open factor of multi-controller 80, flow regulating valves 21 to 23, the details of correcting conditions for the required cooling capacities, and the related matters which were described in the copending application will be incorporated into this specification.

It is now assumed that all the indoor units are performing the cooling operation. Indoor controller 91 of indoor unit C calculates the difference between the detected temperature of indoor temperature sensor 111 and the set temperature as set by operation section 101, and transfers frequency setting signal f1 corresponding to the temperature difference to multi-controller 80, as a required cooling capacity. Likewise, frequency setting signals f2 and f3 are output from indoor units D and E, and are transferred to multi-controller 80, as the respective required cooling capacities.

Figure 4:
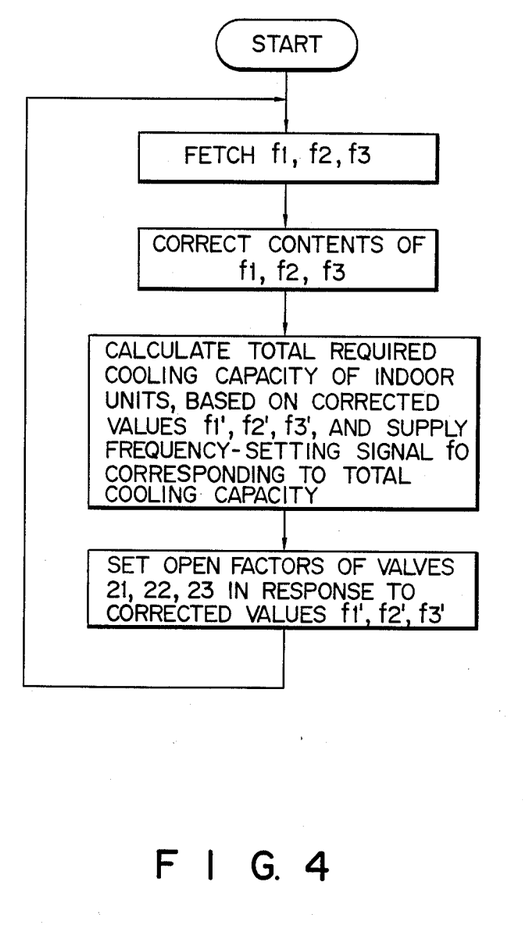
FIGS. 4 and 5 show flowcharts for explaining the operation of the embodiment.

As shown in FIG. 4, multi-controller 80 first fetches signals f1, f2 and f3. It then corrects the frequency setting signal f0 representative of a total amount of these signals f1, f2 and f3 or the contents of each of frequency setting signals f1, f2 and f3, on the basis of the capacities (or horsepower) of the associated outdoor units. Based on the corrected values f1', f2', and f3', it calculates a total amount of the substantially required cooling capacities of the the indoor units, and supplies frequency setting signal f0' representative of the total amount to outdoor controller 70. At the same time, multi-controller 80 sets the open factors of refrigerant flow regulating valves 21 to 23, based on frequency setting signals f1, f2 and f3, or corrected values f1', f2' and f3'.

Outdoor controller 70 controls the output frequency of inverter circuit 71 based on transferred frequency setting signal f0 or corrected value f0'. Therefore, compressor 1 is operated with the capacity corresponding to the total amount of required cooling capacities of the indoor units. At this time, multi-controller 80 controls the open factors of refrigerant flow regulating valves 21, 22 and 23. Therefore, an optimum amount of refrigerant that corresponds to the required cooling capacity flows into the indoor heat exchangers. The refrigerant superheating state of each indoor heat exchanger is kept constant by expansion valves 31, 32 and 33.

Figure 5:
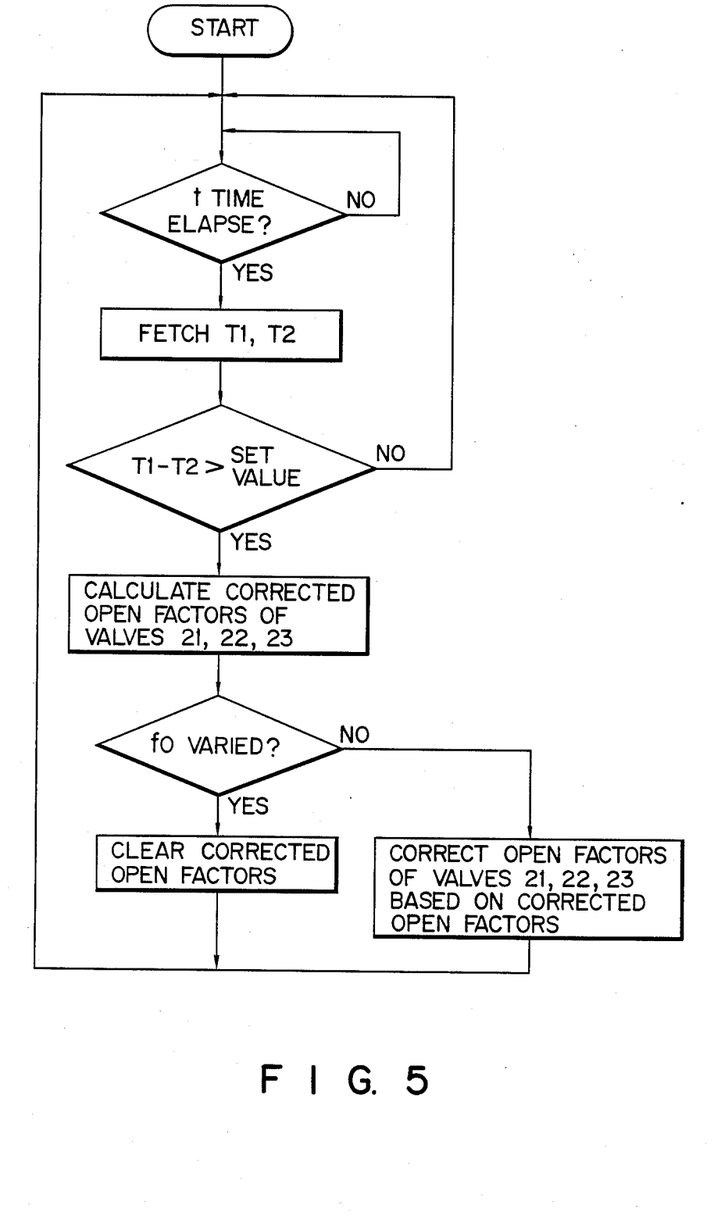

As shown in FIG. 5, during the cooling operation, multi-controller 80 detects temperature T1 of the refrigerant flowing through the aggregated portion of the gas-side refrigerant pipes by temperature sensor 64, every fixed time t (2 to 3 minutes). It also detects temperature T2 of the refrigerant flowing through bypass 62 by means of temperature sensor 63. It then detects the temperature difference (T1−T2). The detected temperature difference is treated as a pseudo-refrigerant superheating state. The pseudo refrigerant overheating state is compared with the reference value of the overheating state. If it exceeds the reference value, the following control operation is performed.

During the cooling operation, if the required cooling capacity of indoor unit C becomes small, the capacity of compressor 1 reduces. At the same time, the open factor of refrigerant flow regulating valve 21 is decreased, and the refrigerant flow to indoor heat exchanger 41 reduces. Under this condition, if an superheating state (high temperature and high humidity state) occurs, the refrigerant superheating state of indoor heat exchanger 41 increases. In response to this, expansion valve 31 is operated to increase its open factor. In this case, however, since the refrigerant flow is regulated by refrigerant flow regulating valve 21, the increase of the refrigerant superheating state cannot be controlled, even if the open factor of expansion valve 31 increases. In this way, when the superheating state of the refrigerant increases, the pseudo-refrigerant superheating state obtained by the detection by temperature sensors 63 and 64 exceeds the reference value accordingly. When the reference value is exceeded, multi-controller 80 sets the corrected open factors for all the refrigerating flow regulating valves 21, 22 and 23 to a predetermined value, or it calculates the open factors on the basis of the capacities (horsepower) of the respective indoor units. If there is no change in the contents of frequency setting signal f0 or f0' (there is no change of the load), the open factors of refrigerant flow regulating valves 21, 22 and 23 are incrementally corrected, on the basis of the predetermined corrected value or the corrected open factors as calculated according to the capacity of each indoor unit. As a result, the increase of the refrigerant superheating state can be restricted rapidly.

This open factor correction is repeated every time t until the pseudo-refrigerant superheat state goes below the reference value. With this correction, the open factors of refrigerant flow regulating valves 21, 22 and 23 progressively become larger. During this correction sequence, if the contents of frequency setting signal f0 or f0' are changed, the corrected open factors are cleared, and the open factor correction is temporarily stopped.

In this way, the pseudo-refrigerant superheating state is detected, and if the refrigerant superheating state control by expansion valves 31, 32 and 33 becomes impossible, the open factors of refrigerant flow regulating valves 21, 22 and 23 are immediately corrected or increased, in order to restrict the increase of the refrigerant overheating state. This makes it possible to optimize the refrigerant superheating state of the entire refrigerating cycle to an appropriate state at all times, thus realizing the stable and effective operation of the refrigerating cycle. Especially in the open factor correction for the refrigerant flow regulating valves, if the correction is made allowing for the capacity of each indoor unit, the capacities of these units will never be out of balance, even when the open factor correction proceeds to some degree. This assures sufficient reliability.

In the case that a pulse motor valve (PMV) is used as the motor-operated flow regulating valves, for the open factor control, the open factor (Q) is calculated by the following equation containing an open factor coefficient (K1), a constant (Ai), and the corrected command frequency (F) of each indoor unit as a reference.

$$\text{factor } Q_{[pulse]} = K1_{[pulse/Hz]} \cdot F_{[Hz]} + A1_{[pulse]}$$

For controlling the superheating state limit, when the PMV is used, the open factor is increased on the basis of the increasing open factor as given by the following expression.

$$\text{Increasing open factor}_{[pulse]} = K2_{[pulse/Hz]} \cdot \frac{A2_{[Hz]} \cdot Ni}{No}$$

where
K2 = open factor coefficient, A2 = constant,
Ni = horsepower of the indoor unit, and
No = horsepower of the outdoor unit While three indoor units are used in the above-mentioned embodiment, 2 units or more than 3 units may also be used. It should be understood that this invention is not limited to the above-mentioned embodiment, but can be variously changed and modified within the scope of this invention.

As seen from the foregoing, the embodiment of this invention comprises an outdoor unit having a variable capacity compressor, a plurality of indoor units each having an indoor heat exchanger, and a refrigerating cycle including refrigerant flow regulating valves and expansion valves, which are coupled with the liquid-side refrigerant piping of each indoor heat exchanger. The embodiment further comprises means for controlling the output frequency of the inverter circuit which supplies a drive power to the compressor, on the basis of the total amount of the open factors of each indoor unit, means for controlling the open factor of each flow regulating valve on the basis of the required capacity of the associated indoor unit, a bypass provided between the aggregated portion of the liquid-side refrigerant piping for the indoor heat exchanger and that of the gas-side refrigerant piping, means for detecting the difference between the refrigerant temperature in the outlet of the bypass and the reference temperature in the aggregated portion of the liquid-side refrigerant piping, and means for resetting the present preset open factors of all the flow regulating valves in predetermined steps or the cooling capacity of the associated indoor units.

This makes it possible to optimally control the refrigerant overheating state in the refrigerating cycle at all times, thus realizing an air conditioner which can operate stably and effectively.

What is claimed is:

1. An inverter-aided multisystem air conditioner comprising:

a single outdoor unit having at least an inverter circuit for supplying a drive power at a predetermined frequency, a compressor motor to be variably driven by the drive power from the inverter circuit, a variable capacity compressor coupled to the compressor motor, and an outdoor heat exchanger coupled to the compressor;

a plurality of indoor units, each having at least an indoor heat exchanger and means for detecting the air-conditioning load of said indoor heat exchanger, said air-conditioning load detect means having means for setting a desired temperature and means for detecting the indoor temperature, and means for outputting data at a predetermined frequency corresponding to a difference between the set temperature by said temperature setting means and the detected temperature by said indoor temperature detect means;

distribution means for coupling said single outdoor unit to said plurality of indoor units in parallel by liquid-side refrigerant piping and gas-side refrigerant piping, to form a refrigerating cycle of a heat pump type, said liquid-side refrigerant piping including motor-operated flow regulating means and pressure reducing means, both being connected in a series fashion;

pseudo-refrigerant superheating state detecting means for detecting a pseudo-refrigerant superheating state on the basis of the temperature of the refrigerant in the aggregated portion of the gas-side refrigerant piping of said distribution means;

first control means for outputting first predetermined control signals respectively for controlling the open factors of said motor-operated flow regulating means in accordance with the predetermined frequency data from said predetermined frequency data generating means of said air-conditioning load detecting mean;

second control means for computing, by using said predetermined frequency data from said predetermined frequency data generating means of said air conditioning load detecting means, a total amount of the contents of said predetermined frequency data corresponding to a total air conditioning load of said indoor heat exchangers, and for outputting second predetermined control signals for controlling the output frequency of said inverter circuit in accordance with the total amount; and third control means for outputting third predetermined control signals each for incrementally controlling the open factor of said motor-operated flow regulating means to a value larger than the current value, on the basis of the detection result of said pseudo-refrigerant superheating state detecting means.

2. The inverter-aided multisystem air conditioner according to claim 1, wherein said pseudo-refrigerant superheating state detecting means includes a first sensor for detecting the temperature of the refrigerant at the outlet side of a capillary tube connecting the liquid-side refrigerant piping and gas-side refrigerant piping of said distribution means in a bypass fashion, and a second sensor for detecting the temperature of the refrigerant in the aggregated portion of said gas-side refrigerating piping, and supplies a pseudo-refrigerant superheating state detecting output signal when the difference between the outputs of said first and second sensor exceeds a predetermined reference value.

3. The inverter-aided multisystem air conditioner according to claim 1, wherein said pseudo-refrigerating superheating state detecting means operates periodically.

4. The inverter-aided multisystem air conditioner according to claim 1, wherein said third control means outputs said third predetermined control signals as obtained by correcting said increasing open factors on the basis of the capacities of said indoor heat exchangers.

5. The inverter-aided multisystem air conditioner according to claim 1, wherein said motor-operated flow regulating means is a pulse motor operated valve.

6. The inverter-aided multisystem air conditioner according to claim 1, wherein said pressure reducing means is a thermo-sensitive expansion valve.

* * * * *